United States Patent
Ardalan et al.

(10) Patent No.: US 6,900,737 B1
(45) Date of Patent: May 31, 2005

(54) REMOTE ACCESS TO ELECTRONIC METERS USING THE SHORT MESSAGE SERVICE

(75) Inventors: Sasan H. Ardalan, Cary, NC (US); David E. Van Den Bout, Apex, NC (US); Arnold W. Bragg, Raleigh, NC (US)

(73) Assignee: Elster Electricity, LLC, Raleigh, NC (US)

( * ) Notice: Subject to any disclaimer, the term of this patent is extended or adjusted under 35 U.S.C. 154(b) by 0 days.

(21) Appl. No.: 09/022,879

(22) Filed: Feb. 12, 1998

Related U.S. Application Data

(60) Provisional application No. 60/037,711, filed on Feb. 12, 1997.

(51) Int. Cl.[7] .............................................. G08B 23/00
(52) U.S. Cl. ............................. 340/870.02; 340/870.07; 455/426.1; 455/466; 379/106.3; 370/474
(58) Field of Search ....................... 340/870.02, 870.03, 340/870.07; 455/33.1, 426, 466; 379/106, 106.3, 56.3; 370/328, 349, 474, 522, 529; 702/68, 62; 348/6

(56) References Cited

U.S. PATENT DOCUMENTS

| | | | |
|---|---|---|---|
| 5,546,444 A | | 8/1996 | Roach, Jr. et al. ............. 379/59 |
| 5,548,527 A | | 8/1996 | Hemminger et al. ........ 364/492 |
| 5,553,094 A | | 9/1996 | Johnson et al. ............. 375/200 |
| 5,675,371 A | * | 10/1997 | Barringer ....................... 348/6 |
| 5,719,918 A | * | 2/1998 | Serbetciouglu et al. ..... 380/271 |
| 5,748,104 A | * | 5/1998 | Argyroudis et al. ... 340/870.11 |
| 5,845,203 A | * | 12/1998 | LaDue ....................... 370/494 |
| 6,014,089 A | * | 1/2000 | Tracy et al. ........... 340/870.02 |
| 6,150,955 A | * | 11/2000 | Tracy et al. ........... 340/870.02 |

\* cited by examiner

*Primary Examiner*—Albert K. Wong
(74) *Attorney, Agent, or Firm*—Woodcock Washburn LLP

(57) ABSTRACT

An automatic meter reading (AMR) system collects readings from multiple or individual meters or sets parameters in individual or multiple meters using the Short Message Service (SMS) in digital cellular networks. The individual meters incorporate interfaces to the SMS network so that parameters within the meter can be read and written to/from external devices that also interface to the SMS network. Communications gateways incorporate a single interface to the SMS network, which a set of non-SMS-enabled meters can access via a local area network (LAN).

20 Claims, 2 Drawing Sheets

REMOTE ACCESS TO ELECTRONIC METERS USING THE SHORT MESSAGE SERVICE

This application claims the benefit of U.S. Provisional application Ser. No. 60/037,711 filed Dec. 12, 1997.

FIELD OF THE INVENTION

The present invention relates generally to electronic meters and automatic meter reading, and more particularly to SMS-enabled electronic meters providing remote two-way access over local area networks and public digital cellular networks.

BACKGROUND OF THE INVENTION

The present invention relates to automatic meter reading (AMR) systems for use in automatically reading electrical energy and other utility meters (e.g., water and gas meters). The invention is more particularly intended for, although not limited to, use in an electronic meter. Further background information on electronic meters can be found in U.S. Pat. No. 5,548,527, Aug. 20, 1996, titled "Programmable Electrical Energy Meter Utilizing a Non-Volatile Memory" (assigned to ABB Power T&D Company Inc.) Further background on automatic meter reading systems can be found in U.S. Pat. No. 5,553,094, Sep. 3, 1996, titled "Radio Communication Network for Remote Data Generating Stations."

SUMMARY OF THE INVENTION

The present invention provides an automatic meter reading (AMR) system that collects readings from multiple or individual meters or sets parameters in individual or multiple meters using the Short Message Service (SMS) in digital cellular networks. According to the invention, individual meters incorporate interfaces to the SMS network so that parameters within the meter can be read and written to/from external devices that also interface to the SMS network. Communications gateways incorporate a single interface to the SMS network, which a set of non-SMS-enabled meters can access via a local area network (LAN).

A system in accordance with the present invention is intended for use in combination with a public switched telephone network (PSTN) and a digital cellular network (DCN) providing a short message service (SMS). The inventive system comprises an automatic meter reading (AMR) network coupled to the DCN by the PSTN, and the AMR network comprises a plurality of meters and an AMR node, wherein the meters are in communication with the node. The meters may communicate with the AMR node via a power line interface and/or a radio frequency (RF) interface.

Presently preferred embodiments of the invention also include an AMR server that communicates with the AMR node via the DCN. In addition, said preferred embodiments comprise a communications gateway operatively coupled to the AMR server, wherein the communications gateway is operatively coupled, and provides an interface, to the PSTN. In addition, an SMS interface within the meters and/or the gateway may be provided to permit remote access to meter parameters. The SMS provided by the DCN permits the AMR node to collect message packets of meter data and to send the message packets to the communications gateway within one or more SMS packets. The communications gateway may receive the SMS packets directly from the DCN or via the PSTN.

The communications gateway, in preferred embodiments of the invention, removes SMS message headers from SMS packets and passes original packets of meter readings from the AMR node to the AMR server, and the AMR server updates an AMR database using readings found in the message packets. In addition, the server encapsulates new utility rates for a meter or group of meters into a packet and passes the packet to the communications gateway, and the gateway encapsulates the packet into a SMS packet and sends it to the AMR node via the SMS.

As an example of the operation of the system, the AMR server sends the following types of messages to the meters: (1) commands to send a current usage reading; (2) commands to send a current rate of power usage; (3) commands to shut-down appliances; (4) commands to apply power to appliances; (5) commands to schedule times at which the meters will power-up and listen for SMS packets; (6) configurations to change the way the meters operate and/or add new functions; and (7) notification of a new phone number or numbers with which to reach the AMR communications gateway.

As another example, the meters and/or AMR node send the following types of messages to the AMR server: (1) notification of meter tampering; (2) notification of power outages; (3) reading of current power usage; (4) reading of current rate of power usage; (5) identification of devices actively drawing power; (6) identification of devices not actively drawing power; (7) identification of services currently supported by the meter; (8) notification of a new phone number with which to reach the meter or AMR node.

As a final example, the AMR server and communications gateway cooperate as follows to initiate the reading of a meter: (1) the AMR server encapsulates a command for reading a meter along with a meter ID into a packet that is passed to the communications gateway; (2) the communications gateway encapsulates the packet from the AMR server into a SMS packet; (3) the gateway uses the meter ID to determine a phone number associated with the meter; (4) the phone number is dialed and the SMS packet is sent via the SMS; the SMS delivers the SMS packet to the meter or AMR node.

Other features of the present invention are disclosed below.

DETAILED DESCRIPTION OF PREFERRED EMBODIMENTS

Short Message Services (SMS) are provided by telecommunications utilities and allow cellular phone customers to send and receive short messages of 160 characters or less. An SMS is available in systems following the CDMA, TDMA and GSM standards. The following description is based on the GSM Public Land Mobile Network Technical Specification published by the European Telecommunications Standards Institute (ETSI) (see GSM 03.02 version 5.0.0: March 1996), but is also valid for systems that provide SMS using CDMA and TDMA.

Figure 1:
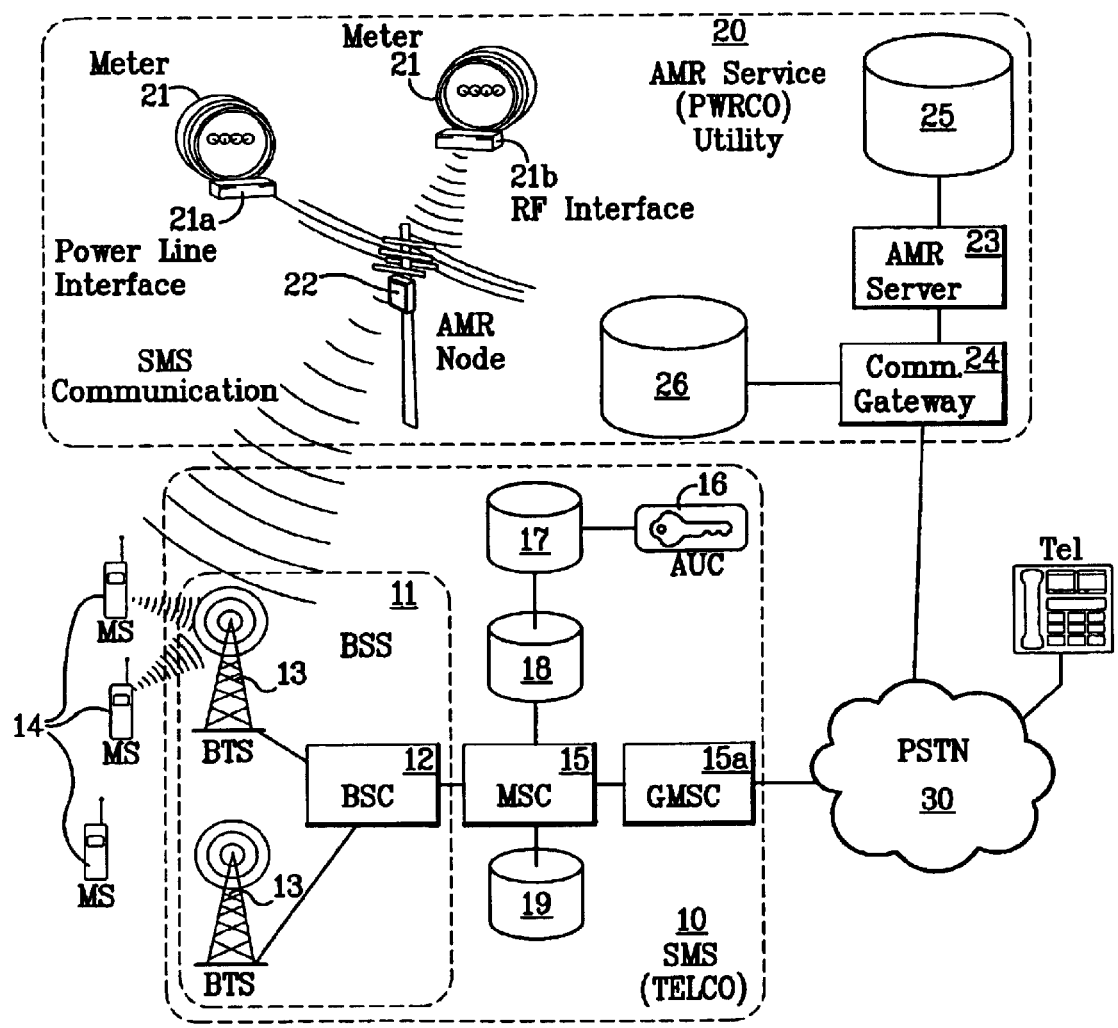
FIG. 1 schematically depicts a presently preferred embodiment of an AMR system in accordance with the present invention.
Figure 2:
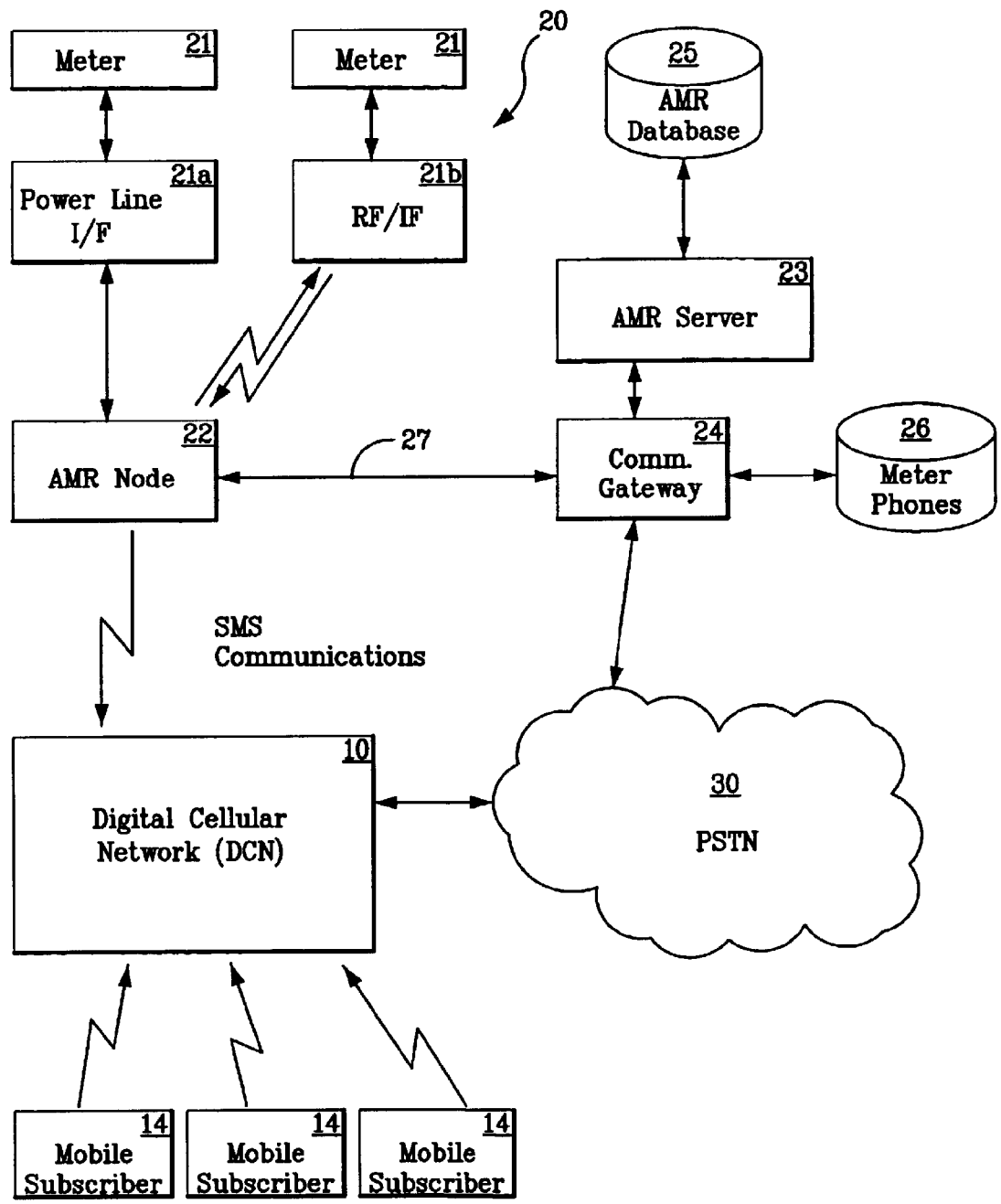
FIG. 2 is a block diagram similar to FIG. 1.

As shown in FIGS. 1 and 2, a presently preferred embodiment of the invention includes a digital cellular network (DCN) 10 that supports SMS; an automatic meter reading (AMR) local area network 20; and a public switched telephone network (PSTN) 30.

As shown in FIG. 1, the DCN 10 includes a base station system (BSS) 11 that comprises a base station controller (BSC) 12 and multiple base transceiver stations (BTSs) 13 in communication with mobile stations (Mss) 14. The BSC 12 is coupled to a mobile switching center (MSC) 15, which has access to an authentication center (AUC) 16, home location register (HLR) 17, visitor location register (VLR) 18, and equipment information register (EIR) 19. The MSC communicates with a gateway mobile service center (GMSC) 15a, which in turn is coupled to the PSTN 30. The AMR network 20 includes a plurality of meters 21 in communication with an AMR node 22 via a power line interface 21a or an RF (radio frequency) interface 21b. The node 22 communicates with an AMR server 23 via the DCN 10. The AMR server 23 is coupled to a communications gateway 24, which provides an interface to the PSTN 30, which is coupled to the DCN 10. As shown in FIG. 2, it is also possible to provide a direct link 27 between the AMR node 22 and the communications gateway 24.

Embedding a SMS interface within a meter 21 or a gateway 24 to multiple meters through a local area network (LAN) (i.e., the AMR network 20) enables remote access to meter parameters on a continuous basis. As shown in FIG. 1, a set of N meters 21 (where N is an integer) communicate through the LAN (which may be, e.g., CEBus over radio frequencies (RF) or power lines) to the AMR node 22. (The Consumer Electronics Bus (CEBus) protocol has been adopted as an Electronics Industry Association standard (EIA IS-60), and defines a LAN that uses multiple media, including power line, radio, twisted pair, coaxial cable, and infrared signaling.) The node 22 is connected to the SMS digital cellular network 10 provided by CDMA, TDMA or GSM. The SMS allows the node 22 to collect the message packets of meter data and send them to the AMR communications gateway within one or more SMS packets. The communications gateway 24 may receive the SMS packets directly from the DCN 10 or they may pass through the PSTN 30. The communications gateway 24 removes the SMS message headers and passes the original packets of meter readings from multiple AMR nodes 22 (only one node is depicted) on to the AMR server 23. The AMR server 23 updates an AMR database 25 using the readings found in the message packets.

The AMR server 23 can also send message packets to the meters. For example, the server may encapsulate new utility rates for a meter or group of meters into a packet that it passes to the communications gateway 24. The gateway encapsulates the packet into a SMS packet and sends it to the AMR node or nodes via the SMS. The communications gateway 24 accesses the SMS via the PSTN 30 or the DCN 10.

The architecture described above can be modified by removing the AMR node 22 and providing each meter with a direct interface to the DCN 10 so that every meter can send and receive SMS packets. Each meter understands how to package its data into a SMS packet and send this packet to the SMS. From the standpoint of the communications gateway 24 and AMR server 23, the sending/receiving of data to/from the meters is unchanged.

The AMR server 23 may send the following types of messages to the meters:

1. Commands to send their current usage reading.
2. Commands to send their current rate of power usage.
3. Commands to shut-down appliances.
4. Commands to apply power to appliances.
5. Commands to schedule the times at which they will power-up and listen for SMS packets.
6. Configurations to change the way the meters operate and/or add new functions.
7. Notification of a new phone number or numbers with which to reach the AMR communications gateway of the server.
8. Commands to disconnect the utility from the customer, or to re-connect a previously disconnected customer, or to limit the amount of service (e.g., the amount of power) available to the customer.

The meters 21 or AMR nodes 22 may send the following types of messages to the AMR server:

1. Notification of meter tampering.
2. Notification of power outages.
3. Reading of current power usage.
4. Reading of current rate of power usage.
5. List of devices actively drawing power.
6. List of devices not actively drawing power.
7. List of services currently supported by the meter.
8. Reading of the unique 32-bit meter ID.
9. Notification of a new phone number or numbers with which to reach the meter or AMR node.

The messages from the AMR server to the node/meters and from the node/meters to the AMR server are all encoded as strings of 0 and 1 bits. The entire string of bits is a message packet. Each message packet includes the following:

1. A 32-bit identifier of the originator of the message.
2. A 32-bit identifier of the recipient of the message.
3. A D-bit descriptor that identifies the type of data encoded in the message packet.
4. A U-bit segment that contains the actual data or commands that are being sent.
5. A bit that indicates whether this is a packet within a larger set of packets that must be concatenated to form a complete message packet.
6. An I-bit message identifier that is the same for all packet segments within a complete message packet. This field only appears if the packet segmentation bit is on.
7. A P-bit field that specifies the total number of packets within a larger message packet. This field only appears if the packet segmentation bit is on.
8. An S-bit sequence field that specifies which place this packet occupies within the larger message packet. This field only appears if the packet segmentation bit is on.

The SMS accepts a phone number and a 140-byte packet from the message originator. The 140-byte packet is encapsulated into a larger SMS packet and is stored for delivery to the mobile station 14 with the given phone number. When the mobile station 14 becomes active, the complete SMS packet is delivered. The header information in the SMS is removed at the MS and the 140 bytes are left for the user of the MS.

The SMS packet allows meters 14, AMR nodes 22, or AMR communications gateways 24 to send or receive 140 bytes of data. The message packets in the AMR application are padded to fill the 140 byte space or are segmented into several smaller packets that fit within the 140-byte limit. Once the padding or segmentation is complete, the 140-byte packets are submitted to the SMS. The SMS delivers the packets to a phone number designated by the originator of the message. (This is the phone number of the communications gateway in the case where meters are sending data to the AMR server, or it is the phone number of an AMR node or meter if the AMR server is sending out commands.)

The AMR server 23 and database 25 work with meter IDs. The AMR server sends and receives packets that refer to meters using the 32-bit IDs. The communications gateway 24 is responsible for remembering which phone number is used to reach a given meter. The association between each meter ID and phone number is stored in a meter/phone database 26 accessible by the communications gateway. The gateway 24 passes the phone number for a given meter ID to the SMS along with the packet from the AMR server 23 encapsulated as a SMS packet. For example, the AMR server and communications gateway would cooperate as follows to initiate the reading of a meter:

1. The AMR server encapsulates the command for reading a meter along with the meter ID into a packet that is passed to the communications gateway.

2. The communications gateway encapsulates the packet from the AMR server into a SMS packet. The gateway uses the meter ID to lookup the phone number associated with the meter. The phone number is dialed and the SMS packet is sent via the SMS. For a meter reading command, it is assumed that the command packet will fit within the 140-byte user data portion of a SMS message, and so no packet segmentation is required. In other scenarios, segmentation of the data or commands into multiple SMS packets with embedded sequence numbers may be necessary.

3. The SMS provided by GSM-type systems delivers the SMS packet to the meter or AMR node. Once the packet is received correctly, the SMS generates an acknowledgment that is delivered back to the communications gateway. If the packet could not be delivered or an error occurred in delivery, the SMS generates an error message that is passed back to the communications gateway. The gateway is responsible for retransmitting the SMS packet.

Each AMR node 22 (or meter 21 in the case where each meter has a direct interface to the SMS) stores the phone number it uses to communicate back to the AMR server 23. An AMR node (or meter) may store multiple phone numbers in the event that the first phone number is out of service.

Each AMR node 22 is reachable through a cellular phone link on the DCN 10. The AMR node receives the SMS packet from the DCN. It saves the 140 bytes of user data that contain the command packet sent from the AMR server 23. Each AMR node maintains a database (not shown) that matches meter IDs with the network IDs of etch meter on the LAN. It uses this database along with the meter ID encoded in the message packet to determine the network address for the meter on the LAN. Then it encapsulates the message packet into a form that can be sent over the LAN to the meter. The detailed steps in this procedure are explained below:

1. The node unpacks the SMS message packet and examines the user data portion to find the meter ID. The node examines the ID and determines if it is for an individual meter or a broadcast ID.

2. If the packet is addressed to an individual meter, then the node must encapsulate the 140-byte user data portion of the SMS packet into a LAN packet that is addressed to the meter using its unique LAN address (which may be different from its ID). The association between the ID and LAN address for each meter is stored in the node. Each time the node receives a packet with an unknown ID, it queries the meters over the LAN to see which meter contains that particular ID. The association is then entered in a table in the node. If no meter claims the CID, the packet is ignored.

3. If the packet is meant for broadcast to all of the meters, then the node must encapsulate the 140-byte user data portion of the SMS packet into a LAN packet that is addressed to the special broadcast address of the LAN (which may be different from the broadcast CID).

4. If the LAN packet is larger than the maximum allowable packet size for the LAN, then the node must segment the packet into smaller pieces. Each piece is labeled with the same LAN address as the original, larger packet.

5. Each piece of the segmented packet is transmitted onto the LAN for reception by one or more of the meters. The node is responsible for receiving acknowledgments of packet receptions from the meters, and for retransmitting packets if they are not received.

Each individual meter listens on the LAN for packets. A meter reconstitutes the original user data portion of the SMS packet from one or more LAN packets, and then executes the commands contained in the packet and sends the results back to the gateway. The steps involved in this process are:

1. The meter examines the LAN address of the packet to see if it is intended for this meter or if it is a broadcast address. If the address is neither of these, the meter ignores the packet.

2. If the packet is specifically addressed for the meter, an acknowledgment of reception is sent back to the node. If an error is found in the packet, a negative acknowledgment is sent back to the node. For broadcast transmissions, no acknowledgment is sent.

3. The received packet is appended to any previously received pieces of the larger segmented packet. When all pieces of the segmented packet are received, the entire user data portion of the original SMS packet is extracted and sent to the meter application software.

4. The meter application will examine the data to see what action is being requested. In this example, assume the command requests the meter to find and return its current reading.

5. The meter application will query the meter electronics to find the current reading.

6. The meter application encapsulates the meter reading along with its ID into a LAN packet. The LAN address of the gateway is then attached and the packet is sent back to the node over the LAN.

7. Once the node receives the LAN packet from the meter, it removes the data portion from the LAN packet and repackages it within a SMS packet along with the meter ID of the originating meter. For a single meter reading operation, it is assumed that the returned data will fit within the 140-byte user data portion of a SMS message so no packet segmentation is required. (In the case of broadcast commands where all the meters are activated and they all return their current readings, then the node is responsible for segmenting the total set of data into multiple SMS packets.)

8. The node sends the SMS packet into the SMS of the DCN using the phone number of the AMR communication gateway to which the node is assigned. The SMS provided by GSM-type systems delivers the SMS packet to the communications gateway. Once the packet is received correctly, the SMS generates an acknowledgment which is delivered back to the AMR node. If the packet could not be delivered or an error occurs in delivery, the SMS generates an error message that is passed back to the node. The node is responsible for retransmitting the SMS packet.

A single meter 21 without an AMR node but with its own wireless access module to the SMS of the DCN 10 can receive SMS packets and return the results to the originator of the SMS packet via the DCN. The steps involved in this process are:

1. The meter receives a SMS packet and unpacks it to examine the meter ID contained in the user data portion. The gateway examines the ID and determines if it is for an individual meter or a broadcast CID.

2. If the ID contained in the packet does not match the ID of the meter or the special broadcast ID, then the packet is ignored.

3. The received packet is appended to any previously received pieces of a larger segmented packet as determined by a sequence number contained in the user data portion of the SMS packet. When all pieces of the segmented packet are received, the entire data portion of the original command is extracted.

4. The meter application will examine the data to see what action is being requested. In this example, assume the command requests the meter to find and return its current reading.

5. The meter application will query the meter electronics to find the current reading.

6. The meter application encapsulates the meter reading along with its ID into a SMS packet. The phone number of the meter's AMR communications gateway is dialed and the SMS packet is sent back via the SMS. For a single meter reading operation, it is assumed that the returned data will fit within the 140-byte user data portion of an SMS message, and so no packet segmentation is required. In other scenarios, segmentation of the returned data into multiple SMS packets with embedded sequence numbers may be necessary.

7. The SMS provided by GSM-type systems delivers the SMS packet to the communications gateway. Once the packet is received correctly, the SMS generates an acknowledgment that is delivered back to the meter. If the packet could not be delivered or an error occurs in delivery, the SMS generates an error message that is passed back to the node. The meter is responsible for retransmitting the SMS packet.

In the previous scenarios, reading of meter parameters by an AMR server was performed. With almost no modification, commands which contain data to be loaded into a meter, meters or AMR node can be sent from an AMR server.

In the previous scenarios, the meters performed actions as directed by an AMR server. It is also possible for meters to self-initiate the transfer of data to the AMR server. Such self-initiation can be used in the event of exception conditions detected by a meter. Meters can also be programmed by SMS packets from the AMR server to periodically dump their data over the DCN. AMR nodes can be programmed in a similar manner to self-initiate the collection of data from the meters attached to their LAN, whereupon the data is returned to an AMR server in a sequence of SMS packets over the DCN.

All of the previously described scenarios and uses of the automated meter reading system via SMS require an interface between the SMS and the AMR service. This interface can be provided in several ways:

1. Each meter 21, AMR node 22 or AMR communication gateway 23 can access the SMS through a cellular phone. Message packets are sent into the SMS by encoding them as sequences of dialing tones which are then decoded by the SMS to form SMS packets.

2. Each meter, AMR node or AMR communications gateway can include circuitry and software that packages message packets into SMS packets with the necessary SMS header information. These SMS packets are sent out on the frequencies of the DCN to directly access the base transceiver station (BTS) 13 and gain entry to the SMS.

3. Each AMR communications gateway 24 may dial into an access number of the PSTN 30 to access the SMS. Message packets are sent through the PSTN and into the SMS by encoding them as sequences of dialing tones that are then decoded by the SMS to form SMS packets.

4. Each AMR communications gateway 24 may have a direct link to the GMSC 15a via ISDN or other type of network. SMS packets can be read or written by the communications gateway from/to the GMSC using email or other protocols.

In sum, the present invention offers the following features: (1) the ability to read individual and multiple meter data using digital cellular technology including CDMA, TDMA, and GSM; (2) the ability to set and read parameters in individual and multiple meters using digital cellular technology including CDMA, TDMA and GSM; (3) the ability to set and read parameters in individual and multiple meters using digital cellar technology using the Short Messaging Service (SMS).

The foregoing detailed description of preferred embodiments of the invention is not meant to limit the scope of protection of the following claims. Those skilled in the art of electronic metering will recognize that many modifications may be made to the presently preferred and specifically described embodiments without departing from the true spirit of the invention.

We claim:

1. A system for use in combination with a public switched telephone network (PSTN) and a digital cellular network (DCN) providing a short message service (SMS), comprising an automatic meter reading (AMR) network operatively coupled to said DCN by said PSTN, wherein said AMR network comprises a plurality of meters and an AMR node, said meters being in communication with said node, and an AMR server operatively coupled to the PSTN, whereby said meters are permitted to send and receive message packets to/from the AMR server via the SMS.

2. A system as recited in claim 1, wherein at least one of said meters communicates with said AMR node via a power line interface.

3. A system as recited in claim 1, wherein at least one of said meters communicates with said AMR node via a radio frequency (RF) interface.

4. A system as recited in claim 1, wherein said AMR node communicates with said AMR server via the DCN.

5. A system as recited in claim 4, further comprising a communications gateway operatively coupled to said AMR server, wherein said communications gateway is operatively coupled, and provides an interface, to the PSTN.

6. A system as recited in claim 1, wherein said DCN comprises a base station system (BSS) that includes a base station controller (BSC) and multiple base transceiver stations (BTSs) in communication with mobile stations (MSs), and a mobile switching center (MSC) that is operatively coupled to said PSTN.

7. A system as recited in claim 1, wherein an SMS interface within said meters permits remote access to meter parameters.

8. A system as recited in claim 5, wherein an SMS interface within said communications gateway permits remote access to meter parameters.

9. A system as recited in claim 5, wherein the SMS provided by the DCN permits said AMR node to collect message packets of meter data and to send said message packets to said communications gateway within one or more SMS packets.

10. A system as recited in claim 5, wherein said communications gateway receives SMS packets directly from the DCN.

11. A system as recited in claim 5, wherein said communications gateway receives SMS packets indirectly from the DCN via said PSTN.

12. A system as recited in claim 5, wherein said communications gateway removes SMS message headers from SMS packets and passes original packets of meter readings from said AMR node to said AMR server.

13. A system as recited in claim 5, wherein said AMR server updates an AMR database using readings found in the message packets.

14. A system as recited in claim 5, wherein said AMR server sends message packets to said meters.

15. A system as recited in claim 5, wherein said server encapsulates new utility rates for a meter or group of meters into a packet and passes the packet to the communications gateway, and said gateway encapsulates the packet into a SMS packet and sends it to the AMR node via the SMS.

16. A system as recited in claim 1, wherein at least one of said meters is provided with a direct interface to said DCN such that said meter can send and receive SMS packets.

17. A system as recited in claim 5, wherein said AMR server sends the following types of messages to the meters: (1) commands to send a current usage reading; (2) commands to send a current rate of power usage; (3) commands to shut-down appliances; (4) commands to apply power to appliances; (5) commands to schedule times at which the meters will power-up and listen for SMS packets; (6) configurations to change the way the meters operate and/or add new functions; (7) and notification of a new phone number or numbers with which to reach the AMR communications gateway.

18. A system as recited in claim 5, wherein said meters and/or AMR node send the following types of messages to said AMR server: (1) notification of meter tampering; (2) notification of power outages; (3) reading of current power usage; (4) reading of current rate of power usage; (5) identification of devices actively drawing power; (6) identification of devices not actively drawing power; (7) identification of services currently supported by the meter; (8) notification of a new phone number with which to reach the meter or AMR node.

19. A system as recited in claim 5, wherein said AMR server and communications gateway cooperate as follows to initiate the reading of a meter: (1) the AMR server encapsulates a command for reading a meter along with a meter ID into a packet that is passed to the communications gateway; (2) the communications gateway encapsulates the packet from the AMR server into a SMS packet; (3) the gateway uses the meter ID to determine a phone number associated with the meter; (4) the phone number is dialed and the SMS packet is sent via the SMS; the SMS delivers the SMS packet to the meter or AMR node.

20. A system as recited in claim 5, wherein the communications gateway is directly linked to the GMSC via a network protocol, whereby SMS packets can be read or written by the communications gateway from/to the GMSC using email or other protocols.

* * * * *

UNITED STATES PATENT AND TRADEMARK OFFICE
CERTIFICATE OF CORRECTION

PATENT NO. : 6,900,737 B1 Page 1 of 1
DATED : May 31, 2005
INVENTOR(S) : Ardalan et al.

It is certified that error appears in the above-identified patent and that said Letters Patent is hereby corrected as shown below:

Title page, Item [54] and Column 1, Line 3,
Title, after "SERVICE", insert -- (SMS) --.

Column 1,
Line 6, delete "Dec. 12, 1997." and replace with -- Feb. 12, 1997. --.

Column 5,
Line 50, delete "etch" and replace with -- each --.

Column 8,
Line 27, delete "cellar" and replace with -- cellular --.
Line 46, delete "SMS." and replace with -- SMS, and wherein SMS message packets are addressable to the individual meters, whereby parameters within the meter can be read and written to/from external devices that also interface to the SMS. --.

Signed and Sealed this

Thirty-first Day of January, 2006

JON W. DUDAS
*Director of the United States Patent and Trademark Office*